United States Patent [19]

Starcevich

[11] Patent Number: 5,186,990
[45] Date of Patent: Feb. 16, 1993

[54] BIODEGRADABLE AND WATER SOLUBLE PACKAGING MATERIAL

[75] Inventor: Bradley K. Starcevich, Woodstock, Ill.

[73] Assignee: Eagle Scientific Co., Woodstock, Ill.

[21] Appl. No.: 681,107

[22] Filed: Apr. 5, 1991

[51] Int. Cl.$^5$ .............................................. B29C 67/22
[52] U.S. Cl. ....................................... 428/35.6; 264/53;
264/118; 264/141; 264/DIG. 5; 206/584;
521/79; 521/82; 521/84.1
[58] Field of Search ............... 264/109, 118, 141, 142,
264/53, DIG. 5; 206/523, 584, 814; 53/472;
220/DIG. 30; 428/35.6, 402; 521/79, 82, 84.1

[56] References Cited

U.S. PATENT DOCUMENTS

| | | | |
|---|---|---|---|
| 2,579,036 | 12/1951 | Edelman . | |
| 2,622,985 | 12/1952 | Haughey et al. . | |
| 2,649,959 | 8/1953 | Hallahan . | |
| 2,838,401 | 6/1958 | Gates . | |
| 3,047,136 | 7/1962 | Graham . | |
| 3,074,543 | 1/1963 | Stanley . | |
| 3,128,690 | 4/1964 | Maehl . | |
| 3,256,115 | 6/1966 | Stearns et al. | 264/141 |
| 3,304,219 | 2/1967 | Nickerson . | |
| 3,458,322 | 7/1969 | Kelley et al. . | |
| 3,651,877 | 3/1972 | Wise et al. . | |
| 3,655,500 | 4/1972 | Johnson . | |
| 3,656,965 | 4/1972 | Strommer et al. | 99/81 |
| 4,042,658 | 8/1977 | Collins | 264/45.5 |
| 4,123,989 | 11/1978 | Jewett | 118/49.5 |
| 4,157,696 | 6/1979 | Carlberg . | |
| 4,184,311 | 1/1980 | Rood | 53/434 |
| 4,440,575 | 4/1984 | Daussan et al. . | |
| 4,458,629 | 7/1984 | Gerber . | |
| 4,500,586 | 2/1985 | Bussey, Jr. | 428/174 |
| 4,566,831 | 1/1986 | Groth | 410/117 |
| 4,621,022 | 11/1986 | Kohaut et al. | 428/397 |
| 4,627,947 | 12/1986 | Voss | 264/53 |
| 4,644,733 | 2/1987 | Dolinar | 53/472 |
| 4,806,410 | 2/1989 | Armington et al. | 428/126 |
| 4,863,655 | 9/1989 | Lacourse et al. | 264/53 |
| 4,997,091 | 3/1991 | McCrea | 206/584 |
| 5,035,930 | 7/1991 | Lacourse et al. | 428/35.6 |
| 5,043,196 | 8/1991 | Lacourse et al. | 428/35.6 |

FOREIGN PATENT DOCUMENTS 0376201 7/1990 European Pat. Off. .... 220/DIG. 30
607042 6/1926 France .

*Primary Examiner*—Mary Lynn Theisen
*Attorney, Agent, or Firm*—Hill, Van Santen, Steadman & Simpson

[57] ABSTRACT

A lightweight, biodegradable packaging material and method for manufacturing the same. The product is made from an initial or starting material which is principally corn grit that is mixed with a binding agent and water extruded under heat and pressure and allowed to expand to form the packaging material.

9 Claims, 1 Drawing Sheet

BIODEGRADABLE AND WATER SOLUBLE PACKAGING MATERIAL

BACKGROUND OF THE INVENTION

This invention relates to material used in the packaging of items, sometimes known as fill material, and more particularly, to biodegradable packaging material.

Packaging material can be characterized as material which surrounds an item that is to be shipped in a container (e.g., a box) and which is to protect the item from breakage or damage. This material can be in the form of loose beads or small discs (sometimes referred to as "void fill"), corner protectors, dividers, etc. Presently such material is a petroleum-based product such as polystyrene, styrofoam, etc. While this material may provide desired cushioning and protection, it presents a disposal and environmental problem. More specifically, such materials can present a significant disposal problem in that they contain petroleum products or derivatives which do not readily degrade, especially in landfills. In view of current environmental concerns, this inability to degrade can be a significant problem.

Thus it is an object of this invention to provide a suitable packaging material that exhibits the ability to degrade in landfill-type disposal, and in particular, is biodegradable (i.e., will degrade by biological action as in a landfill).

These and other objects of this invention will become apparent from the following disclosure and appended claims.

SUMMARY OF THE INVENTION

There is provided by this invention a biodegradable packaging material that can be disposed of in commercial landfills and produced in the standard shapes. The invention relates to the method of making the material and the composition of the material.

The packaging material or end product is produced by preparing an initial mixture of individually biodegradable ingredients, mixing and extruding the mixture, and expanding the extruded mixture to a desired density. The expanded end product is free of petroleum products and other non-biodegradable products. The biodegradability of the packaging material derives from the fact that the initial mixture is predominantly composed of corn, rice, wheat, or other grain. Moisture is used as the expanding agent, guar gum as a binding agent, and small amounts of calcium propinate as an anti-mold agent.

Moreover, water soluble dyes or coloring agents of various kinds can be added to the mixture so as to color the final product and act as an indicator by "bleeding" when contacted by water, as when the package is soaked. Mold inhibiting agents and fragrances can also be used.

DESCRIPTION OF THE PREFERRED EMBODIMENT

In General

Figure 1:
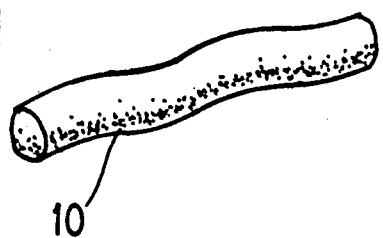
FIG. 1 is a fanciful view of a particle of loose fill.

Referring to FIG. 1, there is shown an elongated particle 10 for package filling which is about two inches long and one-half inch in diameter. The particle has a cylinder-like shape. The fill has a density of about two pounds per cubic foot although densities between 0.6 and 2.5 pounds per cubic foot are acceptable.

Figure 2:
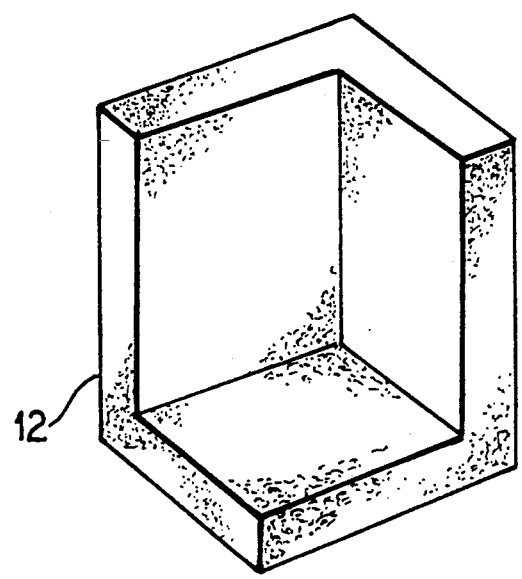
FIG. 2 is a view of a corner protector formed from the material of this invention.

Referring now to FIG. 2, the material can be formed into many shapes such as the corner protector 12 shown therein.

Figure 3:
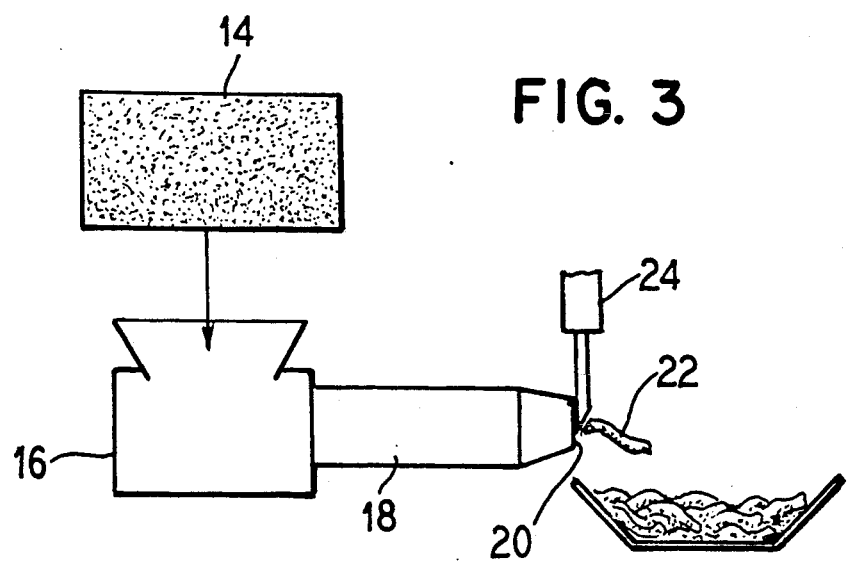
FIG. 3 is a diagrammatic view of an apparatus for carrying out this invention.

In general the process is shown in a diagrammatical and flow-style as in FIG. 3. There the initial mixture 14 is shown being deposited into a mixture chamber 16. From there the mixed material is positioned in an extrusion chamber 18. The material exits the chamber through a disc or flow plate 20. The extruded material such as 22 in this case is cylindrical form, exits the extrusion chamber (at which point the mixture expands) and is cut by knife 24 to the desired length. The cut fill then has a shape as in FIG. 1 and is collected for use.

The Initial Mixture

Turning first to the initial mixture, it is principally a grain or mixtures of grains, namely corn, rice, wheat, etc., which are biodegradable and water soluble. The grain is mixed with an anti-mold agent, a binder, and if desired, a coloring agent and a fragrance. Other ingredients can be added. The term "grain" is defined by the U.S Department of Agriculture in Official U.S. Standards for Grain, Subpart A, §810.101 et seg., pages A-1 to A-5:

"§810.101 Grains for which standards are established.

Grain refers to barley, corn, flaxseed, mixed grain, oats, rye, sorghum, soybeans, sunflower seed, triticale, and wheat. Standards for these food grains, feed grains, and oilseeds are established under the U.S. Grain Standards Act."

"Corn" is defined in Official U.S. Standard for Grain, Subpart C, §810.401, et seq., pages C-1 to C-4:

"§810.401 Definition of corn.

Grain that consists of 50 percent or more of whole kernels of shelled dent corn and/or shelled flint corn (*Zea mays* L.) and not more than 10.0 percent of other grains for which standards have been established under the U.S. Grain Standards Act."

In order to assure effective mixing and dispersal, it has been found to be necessary to control the particle size of the ingredients, particularly the grain. Thus in order to assure effective mixing, the particle size should not be too great or too small. Thus the particle size can be between 0.85 and 1.18 inches.

The principal element of the initial mixture is a grain (i.e., corn, wheat or rice), and the preferred grain is corn. Usually corn constitutes about 97% by weight of the initial mixture. However, it has been found that corn can vary between about 80% and 97%. For this mixture the grain known as yellow corn grits is preferred, which is defined as "a coarse granulation, flour-free yellow grits made from degerminated corn with no chemical additives or derivatives". Typical characteristics are as follows:

Analysis:

-continued

| | |
|---|---|
| Moisture | 12.5–14.0% by weight |
| Protein | 6.5–8.0% |
| Ash | 0.20–0.30% |
| Fat | 0.5–1.0% |
| Fiber | 0.25–.40% |
| Starch | 76.0–80.0% |
| Granulation: | |
| On US 16 | 0–5% |
| On US 20 | 60–80% |
| On US 30 | 15–35% |
| On US 40 | 0–3% |
| Thus US 40 | 0–2% |

Such a material is available from Illinois Cereal Mills, Inc., 616 South Jefferson Avenue, P.O. Box 550, Paris, Il 61944-0850, under the name Yellow Corn Grits #252–257.

If desired, roasted or unsaturated wheat germ can be used in the initial mixture to add resilience to the final material. This is an optional ingredient commonly added in an amount of about 5% by weight of the initial mixture to a maximum of about 10%.

In the initial mixture, usually some water is added to the mixture to raise the total moisture content to the range of about 14%–16% by weight of the mixture, that is, moisture in the corn or grain plus added moisture.

Next, guar gum is added to the mixture as a binding agent. Guar gum is a cold water swelling hydrocolloid made from mannogalactan (found in the seeds of the guar plant). A specific product is sold by National Starch and Chemical Corporation, Finderne Avenue, Bridgewater, N.J. 08807, under the trade name "Dycol 4500F Guar Gum". About 0.50% guar gum is used.

An anti-mold agent such as calcium propinate is used in amounts of about 0.02% (±0.01%).

If desired, a water soluble coloring agent can be added to the mixture which colors the final product and may act as an indicator of change. The coloring agent is added in amounts effective to color the end product which can be about 0.24% by weight of an Food, Drug and Cosmetics (FD&C) approved product such as FD&C Yellow #6, FD&C Blue #2, FD&C Red #3, etc., or combinations thereof. One such material FD&C Yellow #6 is available from Crampton and Knowles Corporation, Ingredient Technology Drive, 1595 MacArthur Boulevard, Mahwah, N.J. 07430, under their identification No. 8604 Sunset Yellow Powder.

The Mixing and Extrusion

The mixing can take place in a mixing chamber such as 16 and from there the mixture can be directed to a food extruder such as 18. Food extruders are known and generally include a screw-type advancing mechanism in a cylindrical housing or stator that forces product through an orifices or extension openings. Typical food extruders are identified as Maddox MX 625, Maddox Metal Works, Inc., 4031 Bronze Way, Dallas, TX 75237-1092; Wenger X-258, 714 Main Street, P.O. Box 130, Sabetha, Kans. 66534-0130; Clextral BC72, Clextral SA, BP 10, 42702 Firminy Cedex, France; Werner & Pfleiderer Single or twin screw, Werner & Pfleiderer Corporation, 663 East Crescent Avenue, Ramsey, N.J. 07446; V. D. Anderson single screw, V. D. Anderson, Strongville, OH 44136; Richheim Baked type, etc., Richheim Co., P.O. Box 197, U.S. 31 South, Lakeville, Ind. 46536.

As the mixture is in the extruder it mixes, is under pressure and is heated. When the mixture reaches the disc or flow plate 20 (i.e., orifice plate), it is at a temperature of about 348° F. Generally the temperature should be between about 345° F. and 351° F. Below about 345° F. the product is not sufficiently expanded and thus too dense. Over about 351° F. the density is too light and strength and resilience decrease.

The foregoing temperature is critical.

The Expanded Product

As the mixture exits the extruder via the flow plate or die, the super heated moisture in the mixture vaporizes forcing the material to expand to its final shape and density. The optimum density is about two pounds per cubic foot, but about 0.6 to about 2.5 pounds per cubic foot is acceptable. In one embodiment, in order to produce fill, elongated and cylindrical pieces about 1.5 inches are cut with the cutter 24. In the alternative, the material can be extruded into a mold in order to form container, corners, dividers, etc.

The expanded product can be used to package and cushion items. Moreover, the material is not conductive to static electricity and thus does not cling.

Moreover, the coloring agent can color the fill, but if the container has been exposed to moisture or water, the agent will run and thus act as an indicator of possible damage.

Although the invention has been described with respect to preferred embodiments, it is not to be so limited as changes and modifications can be made which are within the full intended scope of the invention as defined by the appended claims.

I claim as my invention:

1. A method of making an expanded biodegradable, low density, packaging material which is substantially free of petroleum-based products comprising the steps of:
   a. mixing at least one grain, a biodegradable binding agent and water to form an initial mixture which is principally grain, an amount of binding agent effective to bind the final product together, and water in an amount effective to provide an expanding agent;
   b. extruding said mixture so as to mix, heat and shape said mixture, and said mixture being heated to a temperature between about 345°0 and 351° F.;
   c. permitting said mixture to expand to form a material which is suitable for packaging having a density in the range of 0.6 to 2.5 pounds per cubic feet, wherein said binding agent is present in the amount of 0.5% by weight;
   d. said water being present in an amount effective to raise the total water in the mixture to between about 14% and 16% for assuring subsequent expansion; and
   e. whereby the grain is corn grit in an amount between 80–97% by weight of said mixture.

2. A method as in claim 1, wherein the corn grit consists essentially of:

| | |
|---|---|
| Moisture | 12.5–14.0% by weight |
| Protein | 6.5–8.0% |
| Ash | 0.20–0.30% |
| Fat | 0.5–1.0% |
| Fiber | 0.25–.40% |
| Starch | 76.0–80.0% | and has a particle size distribution as determined by standard U.S. sieve as follows:

| Granulation: | |
|---|---|
| On US 16 | 0–5% |
| On US 20 | 60–80% |
| On US 30 | 15–35% |
| On US 40 | 0–3% |
| Thus US 40 | 0–2% |

3. A method as in claim 2, wherein the initial mixture further includes an biodegradable anti-mold agent consisting essentially of calcium propinate in an amount between 0.01% and 0.03% by weight.

4. A method as in claim 3, wherein the initial mixture further includes a water soluble coloring agent in an amount effective to color the packaging material.

5. A method as in claim 1, wherein the initial mixture also includes wheatgerm in an amount up to about 10% by weight.

6. A product made by the process of claim 1, and which is biodegradable.

7. A product as in claim 6, wherein the product is used for packing fill.

8. a method of making an expanded biodegradable, low density, packaging material which is substantially free of petroleum-based products comprising the steps of:
  a. mixing at least one grain, a biodegradable binding agent and water to form an initial mixture which is principally grain, an amount of binding agent effective to bind the final product together, and water in an amount effective to provide an expanding agent;
  b. extruding said mixture so as to mix, heat and shape said mixture, and said mixture being heated to a temperature between about 345° and 351° F.;
  c. permitting said mixture to expand to form a material which is suitable for packaging having a density in the range of 0.6 to 2.5 pounds per cubic feet, wherein said binding agent is present in the amount of 0.5% by weight;
  d. said water being present in an amount effective to raise the total water in the mixture to between about 14% and 16% for assuring subsequent expansion; and
  e. whereby the grain is corn grit in an amount between 80–97% by weight of said mixture; and wherein
  f. The corn grit consists essentially of:

| Moisture | 12.5–14.0% by weight |
|---|---|
| Protein | 6.5–8.0% |
| Ash | 0.20–0.30% |
| Fat | 0.5–1.0% |
| Fiber | 0.25–.40% |
| Starch | 76.0–80.0% | and has a particle size distribution as determined by standard U.S. sieve as follows:

| Granulation: | |
|---|---|
| On US 16 | 0–5% |
| On US 20 | 60–80% |
| On US 30 | 15–35% |
| On US 40 | 0–3% |
| Thus US 40 | 0–2% | g. the initial mixture further includes a biodegradable anti-mold agent consisting essentially of calcium propinate in an amount between 0.01% and 0.03% by weight;
  h. the initial mixture further includes a water soluble coloring agent in an amount effective to color the packaging material; and
  i. the initial mixture also includes a wheat germ in an amount up to about 10% by weight.

9. A product as in claim 8, wherein the product is used for packing fill.

* * * * *